J. A. GOODWIN.
VEHICLE DIRECTION INDICATOR.
APPLICATION FILED MAR. 17, 1915.
1,234,751.
Patented July 31, 1917.
3 SHEETS—SHEET 1.
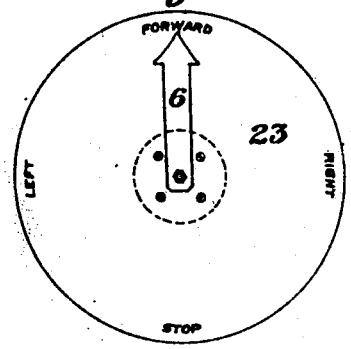
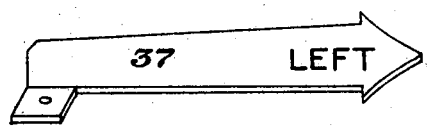
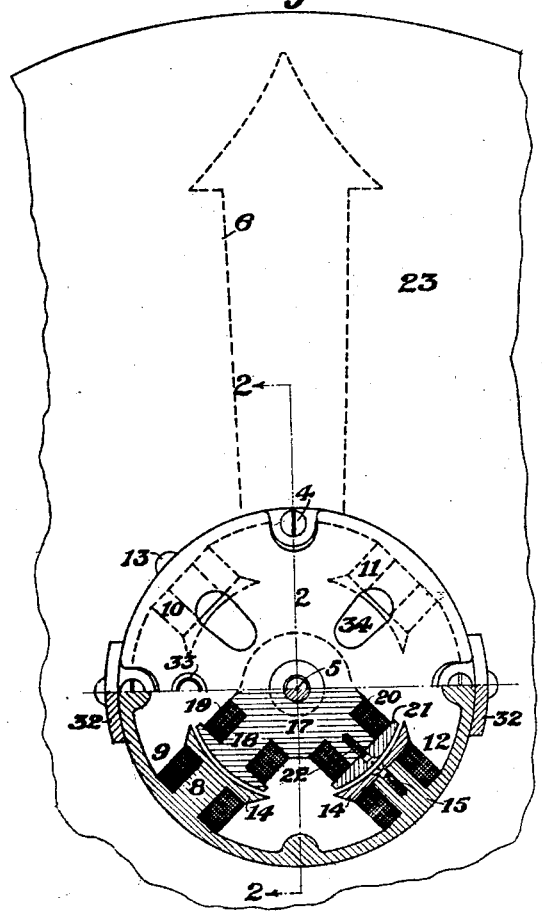
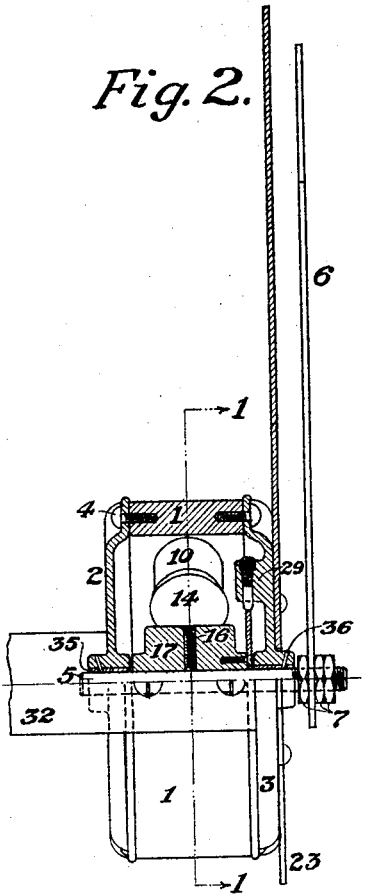

J. A. GOODWIN.
VEHICLE DIRECTION INDICATOR.
APPLICATION FILED MAR. 17, 1915.
1,234,751.
Patented July 31, 1917.
3 SHEETS—SHEET 2.
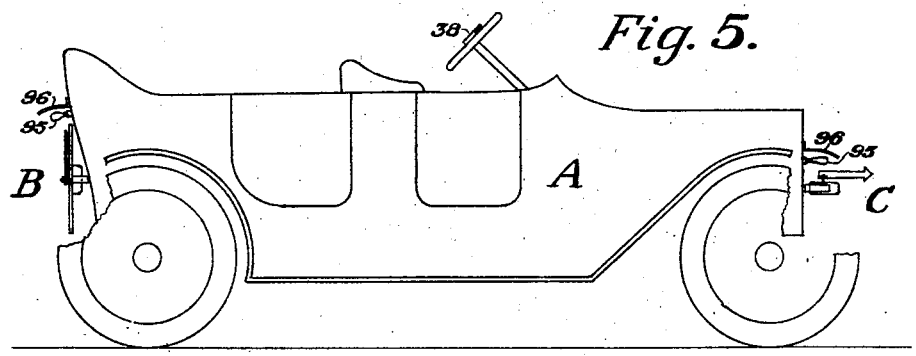
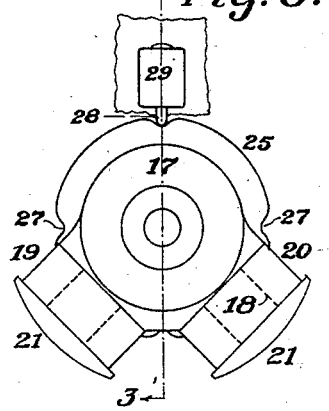
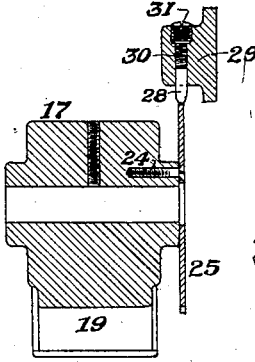
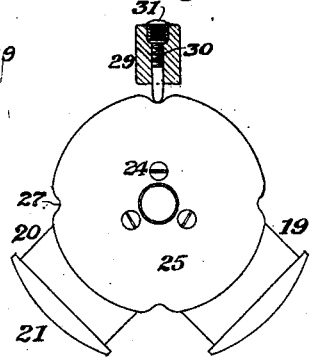
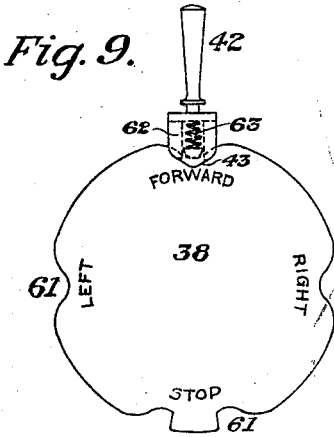
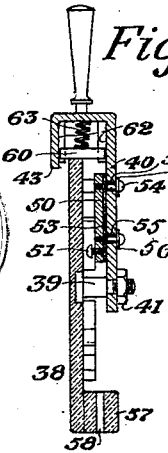
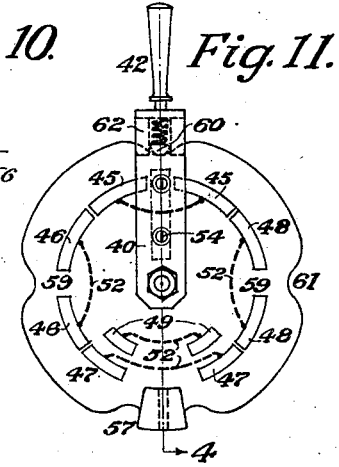

J. A. GOODWIN.
VEHICLE DIRECTION INDICATOR.
APPLICATION FILED MAR. 17, 1915.

1,234,751.

Patented July 31, 1917.
3 SHEETS—SHEET 3.

UNITED STATES PATENT OFFICE.

JAMES A. GOODWIN, OF ST. LOUIS, MISSOURI.

VEHICLE DIRECTION-INDICATOR.

1,234,751.   Specification of Letters Patent.   Patented July 31, 1917.

Application filed March 17, 1915. Serial No. 15,128.

*To all whom it may concern:*

Be it known that I, JAMES A. GOODWIN, a citizen of the United States, residing at St. Louis and State of Missouri, have invented certain new and useful Improvements in Vehicle Direction-Indicators; and I do hereby declare the following to be a full, clear, and exact description of the invention, such as will enable others skilled in the art to which it appertains to make and use the same.

My invention relates to improvements in direction indicating devices for automobiles and other vehicles or means of transportation, and has for one of its objects to provide a simple and reliable device that may be readily attached to any automobile or other vehicle and will operate effectively to signal to approaching vehicles and pedestrians the direction that the vehicle is to pursue.

Another object of the invention is to provide novel electrical means to operate a semaphore signaling arm, said means including magnets and an electric circuit therefor and being controlled by suitable switches or push buttons mounted upon the steering wheel of the vehicle or in any other position suitable and convenient, whereby the driver or other occupant may easily operate the signal.

Another object is to generally improve and simplify the construction of direction indicating devices for automobiles and other vehicles so as to render them more practical, reliable and efficient in operation and inexpensive to manufacture and maintain in operation.

The above and additional objects are accomplished by such means as are illustrated in the accompanying drawings, described in the following specification and then more particularly pointed out in the claims.

With reference to the drawings wherein I have illustrated the preferred embodiment of my invention as it is reduced to practice, and throughout the several views of which similar reference numerals designate corresponding parts.

Figure 1 is a rear view of my indicating device, the upper half of which is an elevation, while the lower half is a vertical sectional view taken along the line 1—1 of Fig. 2.

Fig. 2 is a side view, the upper half of which is a vertical sectional view taken along line 2—2 of Fig. 1, while the lower half is an elevation.

Fig. 3 is a front elevation of my device on a reduced scale, and shows the general appearance of my device which will be mounted on the rear of the vehicle.

Fig. 4 illustrates a perspective view of the indicating arrow as used on the signal mounted in front of the vehicle.

Fig. 5 is a side elevation of an automobile, showing my indicating means attached thereto.

Figs. 6, 7 and 8 show details of the movable magnet system of my device, Fig. 6 being a front elevation, Fig. 7, a vertical sectional view taken along line 3—3 of Fig. 6, while Fig. 8 is a rear elevation.

Figs. 9, 10 and 11 show details of a switch for properly controlling the electrical circuit to secure the desired movements of the indicating arrows, Fig. 9 being a front elevation, Fig. 10 being a vertical section taken at line 4—4 of Fig. 11, while Fig. 11 is a rear elevation.

Fig. 12 illustrates the connections using the type of switch shown in Figs. 9, 10 and 11, while Fig. 13 shows the connections using a two-way switch or push button.

Figure 12:
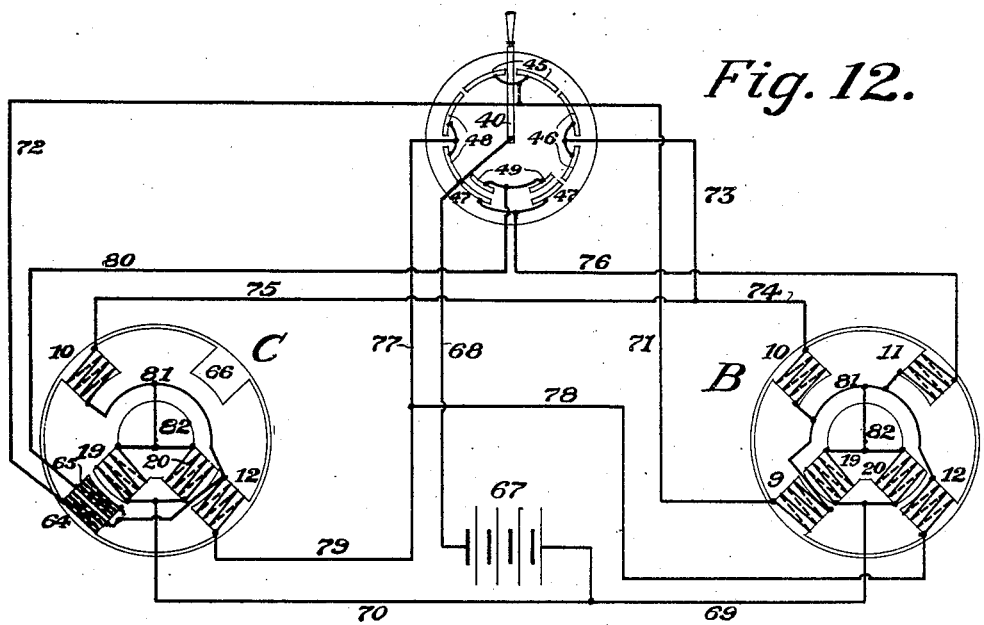
Figs. 12 and 13 are diagrammatic views, showing the device connected for operation at both ends of a vehicle with an electrical circuit.

Referring to the drawings by characters of reference A designates as an entirety an automobile and B and C my improved indicating or signaling device arranged at the rear and front of the automobile.

Figs. 1 and 2 illustrate the construction of device B, which consists of a cylindrical casing 1, closed up on either side by covers 2 and 3, which are secured by screws 4 or other suitable fastening elements to the casing 1 and have journaled transversely therebetween and centrally thereof a rotatable shaft 5 which extends on one side considerably beyond the casing and has mounted thereon a semaphore signaling arrow 6. Nuts 7 securely hold arrow 6 so that it will turn upon rotation of shaft 5.

Secured interiorly of the casing 1 and projecting toward the center thereof from equidistant points is a plurality of cylindrical metallic lugs or projections 8 which form the cores for electro-magnets 9, 10, 11 and 12. Cores 8 may be round, square or rectangular in shape and may be cast integral with the casing 1 or secured thereto by means of screws 13 or other suitable means of fastening. Pole pieces 14 protect the coils of the electro-magnets and properly distribute the magnetic flux to secure the most satisfactory operation of the device. These pole pieces 14 may be cast integral with the cores 8 or else secured thereto by screws 15 or other suitable fastening means.

Mounted upon shaft 5 and secured thereto by screws 16, or other suitable means of fastening, is an armature 17 provided with lugs or cores 18 which are cast integral with the same or else fastened thereto in a suitable manner. The cores 18 are provided with coils and constitute electro-magnets 19 and 20, protected by pole pieces 21, which are either cast integral with the cores 18 or else are secured thereto by screws 22.

Mounted upon the outside cover 3 is a disk 23 upon which are painted in large letters the words "Forward, Right, Stop and Left," or other suitable words, letters or characters as shown, to which indicating arrow 6 points. If desired the disk 23 may be omitted and the words painted directly upon the vehicle.

Secured to armature 17 by screws 24 is a disk 25, upon the circumference of which are cut notches 27. A pin 28 bears upon the circumference of the disk and as the disk revolves due to the action of the electro-magnets, engages in these notches, thus holding the indicator arrow 6 directly in line with one of the words painted on disk 23, even after the current is cut off from the electro-magnets. Pin 28 moves up and down in an opening in lug 29 cast upon the inside of cover 3. A spring 30 is positioned in the opening behind the pin 28 and may be adjusted by a screw 31. It is evident that the notched disk 25 and its coöperating parts may be located entirely outside of the covers 2 and 3 if desired.

Supports 32 are provided for securing the device to the vehicle. Insulating bushing 33 is provided through which the necessary electrical conducting wires enter. If desired covers 2 and 3 can be provided with ventilation holes 34 and suitable bearings 35 and oil holes 36 are provided to secure proper lubrication.

Arrow 37 replaces arrow 6, on the front signaling device C, and carries an angular apertured ear 37ª secured to the shaft 5 of the front operating device. On one side of the arrow 37 is printed the word "Left" as shown, while on the opposite side is printed the word "Right" or other suitable words or characters as desired. In this way when the arrow points toward the left the word "Left" is exposed and when it points toward the right the word "Right" is exposed.

In order to secure the most satisfactory operation of my signaling device, I have provided a special controller type switch illustrated in detail in Figs. 9, 10 and 11. This consists of plate 38 of insulating material as porcelain, fiber, or the like, into which is cast a pin or pivot 39, having a reduced end to receive arm 40 and provided with nut 41 to secure arm 40 in position. Handle 42 fastened to the arm 40 forms a convenient means of turning or operating the switch and the pointer 43 in conjunction with the words "Forward, Stop, Right, and Left" or other suitable words, letters or characters printed or raised on plate 38 indicates the positions of the indicating arrows 6 and 37 of the signaling devices B and C. Relatively stationary plates 45, 46, 47, 48 and 49 form contacts upon which the movable contact plate strip 50 is slidable. A wire from the source of electrical energy is connected to the movable plate 50 by means of screw 51, and each of the two segments 45, 46, 47, 48 and 49 are connected together by wires 52 which are in turn connected to the coils of the electro-magnets in the signaling devices. Thus by shifting the controller handle 42 to the various positions electrical connection is established between the various coils of the electro-magnets in the signaling device and the source of electrical energy.

The movable contact plate 50 is insulated from the arm 40 by insulating strip 53 and secured to arm 40 by screws 54 which are insulated by insulating bushings 55 and insulating washers 56. A lug 57 is provided to prevent turning the handle 42 completely around which would cause the signaling arrow to turn completely around, which would not be desirable or possible with the front signaling device C and which would break the connecting wires in the case of rear device B unless collector rings were provided to provide the electrical connection between the coils of the device and the switch and source of electrical energy. The various electrical connection wires from the various contacts in this switch pass out through hole 58 in lug 57 to connect to the signaling devices and source of electrical energy.

In order to prevent the use of current after the signal arrows 6 and 37 have reached the desired positions, spaces 59, are provided between the different stationary contact plates 45, 46, 47, 48 and 49 of each pair. In order to cause the handle 42 to always remain in these neutral positions when placed there by hand, pin 60 is provided which moves against the circumference of plate 38 and moves into the notches 61, pin 60 is held in its position by lugs 62 formed on arm 40, spring 63 presses pin 60 against the circumference of plate 38 and into the notches 61 therein. Thus current is used only in moving the arrows 6 and 37 to their desired positions, the plate 25 and pin 28 serving to retain the armature 17 and arrows in adjusted position.

This controlling switch is mounted in any convenient location preferably on the steering wheel of the automobile, as shown in Fig. 5.

Fig. 12 shows the necessary connections for the operation of my signaling device. In the present instance, coils 19 are shown as positive while coils 20 are negative, coils 9, 10, 11 and 12 are all negative. In front signaling device C coil 9 is replaced by two coils 64 and 65, which are both negative and connected as shown and no coil is provided at 66, as there is no "stop" position for the front indicator. 67 represents the source of electrical current which may be a primary battery, storage battery, magneto, dynamo, etc., in this case a primary battery being shown. To throw the signaling arrows in the "forward" position, coils 9, 19 and 20 are energized in rear signaling device B and coils 19, 20 and 64 in the front device C, negative coils 9 and 64 attract to them positive coils 19, thus moving the arrows to the forward positions. In the same manner coils 10, when energized, will cause the signaling arrows to move to the "right" positions, while coils 12 will direct the signaling arrows to the "left" positions. To move the arrows to the "stop" position, coils 11, 19, and 20 of the rear signaling device B and coils 19, 20 and 65 of the front device C are energized, positive coil 19 will be attracted to negative coil 11 in the rear device B, thus placing the signaling arrow 6 in the "stop" position. In the front device C negative coil 65 will attract to it positive coil 19 throwing the signaling arrow 37 to the "forward" position. This is desirable as a "stop" position is not necessary in the front of the vehicle, and also due to its possible location, in front of the radiator of an automobile, it would be impossible for the arrow to swing around to the rear.

Conductor 68 connects one side of the battery 67 to arm 40 of the controller switch, while conductors 69 and 70 connect the opposite side of the battery to the coils 19 and 20 of the two devices B and C, respectively. Contact plates 45 are connected with coils 9 and 64 of the two devices B and C by conductors 71 and 72 respectively, contact plates 46 connect with conductor 73, which latter connects to coils 10 of both devices B and C by means of conductors 74 and 75 respectively. Contact plates 47 connect with coil 11 of the device B by means of conductor 76, and conductors 78 and 79 from coils 12 of both devices B and C connect with the conductor 77 connecting with the contact plates 48, conductor 80 connects contact plates 49 to coil 65 of front signaling device C, conductors 81 and 82 connect coils 9, 10, 11 and 12 to coils 19 and 20 in device B, and connect coils 10, 12, 64 and 65 to coils 19 and 20 in device C.

Thus it will be seen if arm 40 is in contact with contact plate 45, the path of the current through device B will be as follows: from source of electrical energy 67, through conductor 69, coils 19 and 20, conductors 82 and 81, coil 9, conductor 71, contact plate 45, arm 40, and conductor 68 back to source 67. Through device C, the path will be as follows:—from source 67, through conductor 70, coils 19 and 20, conductors 82 and 81, coil 64, conductor 72, contact plate 45, arm 40 and conductor 68 back to source 67. Thus positive coils 19 will be attracted to negative coils 9 causing indicating arrows to point to the "forward" positions. In the same manner all the other positions of the controller switch may be easily traced.

Figure 13:
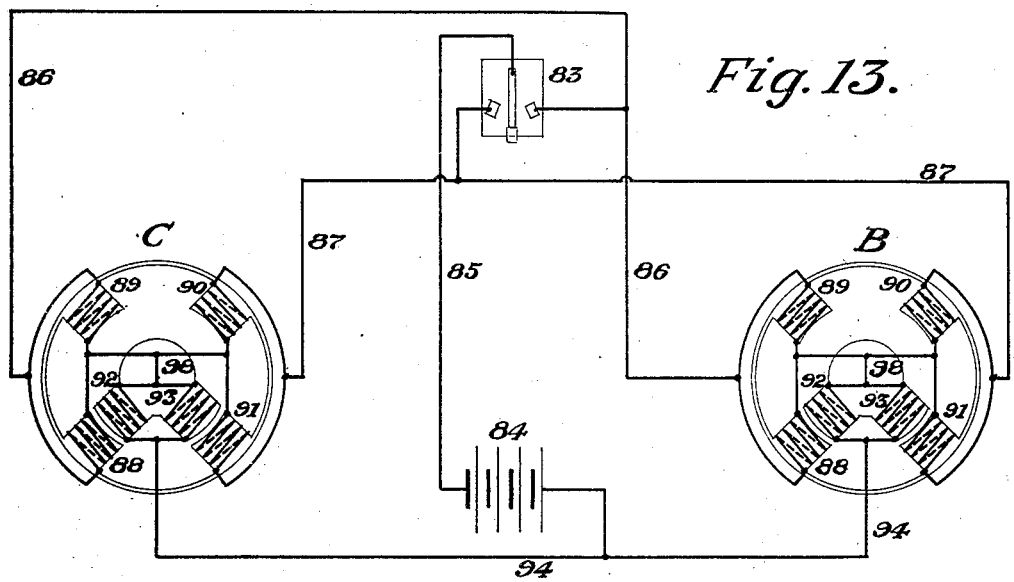

Fig. 13 shows the connections for a modified form of my device. In this case, there are but three positions of the indicating arrow: namely, "right" "forward" and "left." Counterweights or springs hold the indicator arrows always in the "forward" position when the coils are not energized. Switch 83 is provided for regulating the position of the arrows. If pushed to the right contact, the arrows will point to the right and vice versa. Conductor 85 connects the blade of switch 83 to one side of source of electrical current 84, while conductor 94 connects the opposite side to coils 92 and 93. The right contact of switch 83 is connected to coils 88 and 89 by the conductor 86, while the left contact is connected to coils 90 and 91 by means of conductor 87, conductors 98 connect coils 88, 89, 90 and 91 to coils 92 and 93.

With switch 83 on the right contact, the current flows as follows:—from battery 84, through conductor 94, coils 92 and 93, conductor 98, coils 88 and 89, conductor 86, switch 83, and conductor 85 back to battery 84. Coils 89 and 93 are thus energized and are negative, while coils 88 and 92 are energized and are positive. Coils 89 will attract to them coils 92 and coils 88 will attract to them coils 93, thus throwing indicator arrows to the right.

With switch 83 on the left contact, the current flows as follows:—from battery 84 through conductor 94, coils 92 and 93, conductor 98, coils 90 and 91, conductor 87, switch 83 and conductor 85 back to battery 84. Coils 90 and 92 are thus energized and are positive, while coils 91 and 93 are energized and are negative. Coils 90 will attract to them coils 93 and coils 91 will attract to them coils 92, thus throwing the indicator arrows to the left.

In place of switch 83, push buttons or a controller switch similar to that shown in Fig. 12 may be used. It is also evident that the coils and indicators, as units, may be connected in series or parallel or a combination of the two without changing the general idea and intent of my invention. The number and spacing of the magnets and the extent of rotational movement of the indicating arrows may also be varied to suit conditions. If desired collector rings with the necessary brushes may be provided on the shaft 5, to provide the electrical connection between the armature and the stationary coils and other connections, in place of using flexible wire connections. It is also evident that only one coil, as coil 19, may be used on the armature if desired.

It will thus be seen that I have provided two signaling devices on the vehicle, in the front one of which C, the signaling arrow swings in a horizontal plane, while in the rear one, B, the arrow swings in a vertical plane. It is evident that either type could be used at either or both ends. It will be readily seen with reference to the foregoing description and accompanying drawings that I have provided simple, inexpensive and effective signaling means that is capable of being readily attached to vehicles of various characters without necessitating any material change in the construction thereof and which is easy to operate.

In order to make the device as effective at night as in the daytime, I provide preferably electric lamps 95, with reflectors or hoods 96, above each signaling device on the automobile. However, it is evident that the tail light and headlights could be suitably arranged to properly illuminate the semaphore indicating arrows.

In practice, I find that the form of my invention illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth. Furthermore, the devices may be made to indicate any number of positions, as stop and forward, or right, left and forward, or right, left, stop, and forward, etc.

What is claimed is:

1. A vehicle direction indicator comprising a casing, a shaft journaled in a pair of opposite walls of said casing and having one end projecting beyond one of the walls, a signaling arrow secured to said shaft, shaft operating means within the casing, a disk having notches in its edge and secured to said shaft, a lug formed on the inner side of one of said opposed walls, a pin movable in said lug for an engagement with one of said notches to hold the arrow in the position to which it has been moved, and a spring carried by said lug and engaging said pin.

2. A vehicle direction indicator comprising a casing having a pair of side walls, bearings formed on the side walls and at a point centrally thereof, said bearings being disposed upon the interior and exterior of the casing, a circular disk secured to one wall of the casing and having a central opening to receive the exterior portion of one of the bearings, said disk having direction indicating characters thereon and arranged in circular formation, a shaft journaled in said bearings of the opposed walls of the casing and having one end projecting beyond one of the bearings, a signaling arrow secured to said shaft and overlying the disk, shaft operating means within the casing, a disk having notches in its edge and secured to said shaft and located within the interior of the casing, a lug formed on the inner side of one of said opposed walls of the casing, a pin movable in said lug for an engagement with one of said notches to hold the arrow in the position to which it has been moved to indicate direction indicating characters upon the disk, and a spring carried by said lug and engaging said pin.

In testimony whereof I affix my signature in presence of two witnesses.

JAMES A. GOODWIN.

Witnesses:
    LOUIS G. KURTZEBORN,
    PAUL N. GRETHER.